Patented Feb. 14, 1939

2,146,958

UNITED STATES PATENT OFFICE

2,146,958

PROCESS OF REMOVING OBJECTIONABLE SMELL OR TASTE FROM FLOUR OR SIMILAR GROUND PRODUCTS

Alois Kotera, Prague, Czechoslovakia, assignor to Carbo-Norit-Union Verwaltungs - Gesellschaft m. b. H., Frankfort-on-the-Main, Germany, a corporation of Germany No Drawing. Application March 29, 1937, Serial No. 133,746. In Germany April 3, 1936

3 Claims. (Cl. 99—153)

Flour and similar ground products have sometimes a mouldy smell and taste and also an unsatisfactory colour, which may either render them entirely unfit for consumption or have at least more or less detrimental effect on their quality. This disagreeable deterioration is generally due to long storage under unfavourable conditions, but it may also have to be attributed to other causes. It is a particular nuisance in tropical countries and other places with a damp climate.

Up to the present the smell and taste of unsatisfactory ground products, particularly of flour, could not be improved by simple means. Moreover, it has not been possible to improve the keeping properties of ground products that are otherwise quite satisfactory with regard to smell and taste, such as flour.

It has now been found that the smell and taste as well as the keeping properties of ground products can be improved by an admixture of small quantities of activated carbon.

Tests made with flour have shown that even an admixture of only 0.01% or less of activated carbon, calculated on the weight of flour, may be sufficient to improve the smell of unsatisfactory flour. In some instances the effect of the activated carbon may be noticed as early as a few hours after it has been brought into contact with the ground material, whilst in other cases a much longer time may be required, e. g., a couple of days, before the action of the carbon can be perceived. When wheat flour with a distinctly musty smell was treated according to the present invention, an addition of from 0.0075% to 0.01% of activated carbon was sufficient to obtain an inodorous product after a time of contact of about 24 hours.

In carrying out the process according to the present invention, it is advisable to use the activated carbon in the form of powder and to mix this powder with the flour. There are no objections to leaving the carbon in the flour after it has done its duty. Fine-grained activated carbons, e. g., with a particle size that passes through wire cloth with 60 mesh per inch and that is retained on 325 mesh per inch, can be used to advantage in the same manner. It is also possible to use activated carbons with a larger particle size and in larger quantities by first mixing them with the flour or ground product and then separating them again from this material after a sufficient length of time for contact. Whilst any kind of activated carbon will be more or less suitable for this purpose, it will be preferable to employ the various kinds of powdered and granular activated carbons which are generally used for improving the taste and smell of liquids and for adsorbing gases and vapours.

The process can also be carried out in such a manner that the carbon is first mixed with a certain portion of the ground product to be treated and that this mixture is then added to the main portion of the material in question.

In some cases it may moreover be advisable to accelerate the process by keeping the mixtures in motion as long as it is in contact with the activated carbon.

Another feature of the present invention is the surprising fact that the colour of the ground product to be treated is not impaired in any way by adding the black activated carbon. For instance in the case of flour it has been found that after the addition of activated carbon, the mixture had a distinctly whiter colour than the untreated flour. This surprising observation can be made particularly when the ground product to be treated is mixed with carbon in powdered form.

The process can be used for any kind of flour and flour products, such as Indian corn meal, wheat flour, potato flour, buckwheat flour, manioc meal, maizena, etc., which may be used either as food or for industrial purposes, such as the manufacture of adhesives, dressing, and the like.

As already mentioned above, the process according to the present invention not only improves the objectionable smell and taste of ground products but also increases their keeping properties in the case of otherwise perfectly satisfactory conditions. It has moreover been found that the baking properties of flour are frequently improved by the addition of activated carbon.

In the same manner, the present invention can also be used to improve the smell and taste of the original materials from which the ground products are obtained. The same process can thus be successfully employed for treating grain, legumes, and similar materials, such as rye, wheat, rice, lentils, peas, etc. This is all the more surprising because the husks of the individual grains are generally very hard, and it is just underneath these husks where the mould, etc., that has to be destroyed by the activated carbon is formed.

It has been found that activated carbon can be used both for treating spoilt grain or the like and for protecting the fresh products from mould.

The quantity of activated carbon required for the process may vary, depending on the kind of product to be treated and on the extent to which this has gone mouldy. In contradistinction to the removal of mould from ground products, solid products can, if necessary, be treated with a comparatively large quantity of activated carbon, since they are generally washed and thus freed from the latter before being ground. If desired, the activated carbon can also be mixed with other substances, for instance in order to obtain a better distribution of the carbon over the surfaces of the individual grains or to produce an additional effect by means of these substances, e. g., to facilitate the removal of husks by the addition of lime.

I claim:

1. Process of preserving or improving the odor or taste of food products which comprises mixing the food product in sensibly dry finely divided form with a quantity of the order of 0.01% by weight of finely divided activated carbon.

2. Process as defined in claim 1 in which the food product is a member of the group consisting of milled products of cereals and legumes.

3. Process as defined in claim 1 in which the quantity of activated carbon added to the food product is from about 0.0075% to about 0.01% by weight of the food product.

ALOIS KOTERA.